Jan. 20, 1959 W. H. MacWILLIAMS, JR., ET AL 2,870,327

ELECTRONIC PROBABILITY CIRCUIT

Filed March 3, 1953 8 Sheets-Sheet 1

INVENTORS W. H. MAC WILLIAMS, JR.
R. C. WINANS

BY G. H. Heydt

ATTORNEY

ELECTRONIC PROBABILITY CIRCUIT

Filed March 3, 1953 8 Sheets-Sheet 2

INVENTORS W. H. MAC WILLIAMS, JR.
R. C. WINANS

BY G. H. Heydt
ATTORNEY

Jan. 20, 1959 W. H. MacWILLIAMS, JR., ET AL 2,870,327

ELECTRONIC PROBABILITY CIRCUIT

Filed March 3, 1953 8 Sheets-Sheet 3

INVENTORS W. H. MAC WILLIAMS, JR.
R. C. WINANS
BY G. H. Heydt
ATTORNEY

INVENTORS W. H. MAC WILLIAMS, JR.
R. C. WINANS
BY G. H. Heydt
ATTORNEY

ELECTRONIC PROBABILITY CIRCUIT

INVENTORS W. H. MAC WILLIAMS, JR.
R. C. WINANS
BY
G. H. Heydt
ATTORNEY

Jan. 20, 1959 W. H. MacWILLIAMS, JR., ET AL 2,870,327

ELECTRONIC PROBABILITY CIRCUIT

Filed March 3, 1953 8 Sheets-Sheet 6

INVENTORS W. H. MAC WILLIAMS, JR.
R. C. WINANS
BY
G. H. Heydt
ATTORNEY

ELECTRONIC PROBABILITY CIRCUIT

Filed March 3, 1953 8 Sheets-Sheet 7

INVENTORS W. H. MAC WILLIAMS, JR.
R. C. WINANS
BY
G. H. Heydt
ATTORNEY

Jan. 20, 1959 W. H. MacWILLIAMS, JR., ET AL 2,870,327

ELECTRONIC PROBABILITY CIRCUIT

Filed March 3, 1953 8 Sheets-Sheet 8

INVENTORS W. H. MAC WILLIAMS, JR.
R. C. WINANS

BY

G. H. Heydt

ATTORNEY

United States Patent Office 2,870,327
Patented Jan. 20, 1959

2,870,327

ELECTRONIC PROBABILITY CIRCUIT

Walter H. MacWilliams, Jr., Summit, and Robert C. Winans, Chatham, N. J., assignors to Bell Telephone Laboratories, Incorporated, New York, N. Y., a corporation of New York Application March 3, 1953, Serial No. 340,062

17 Claims. (Cl. 250—27)

This invention relates to an electronic probability system, for selecting randomly one event out of two possible events, according to a probability which is continuously variable at will from one selection to another, the selections being made at a repetition rate of the order of one hundred selections, or more, per second.

The present system yields a binary event with a probability which may range from .001 to 1.00, the distribution of events over successive selections made at the same probability being indistinguishable from a random distribution, and the probability existing for one selection having no effect on the probability existing for any other selection.

While the specific system disclosed yields a binary event, the basic principle of the invention is not so limited, and the system is capable of modification to yield one event out of $n$ possible alternative events, with $n$ variable in integer steps up to 10, or more. Thus, by repeating the determinations in an iteration process, the invention may be used to make a particular choice out of a large number of possibilities, for example to choose randomly a particular telephone line out of a group of 10,000 lines.

The invention is shown as embodied in a system for the solution of a particular problem associated with a process whose results are determined by the repeated application of probability, but is not limited thereto, and has utility in the general field of Monte Carlo computation, in cases in which probability is involved in the simulation of an actual problem. Many examples of such problems arise in the telephone field in representing telephone traffic statistics in a throwdown study of telephone traffic, for example, to determine at a given instant whether a given simulated call will be continued or terminated, when the probability of termination at that instant is known; and, in studying the structure of atoms and molecules, to represent the interactions of atomic particles. In active communication systems, the invention permits the determination randomly of one choice out of a considerable number, for example, in allowing the choice of a particular connection from a number of possible connections to be made on a random probability basis rather than a wired-in preferential non-busy basis, and, when using a common piece of test equipment for preventive maintenance of a large matrix of apparatus, for automatically selecting on a random basis the units of the matrix to be tested.

The object of the invention, thus, is a system for randomly selecting a particular event out of a plurality of possible events, according to a probability which may be varied from one selection to another.

A feature of the invention is a probability computer, or p-computer, which, when energized proportionally to a particular value of a parameter of the probability function, generates a voltage representing in magnitude the probabillity of the occurrence of an event.

Another feature of the invention is a circuit which, under the control of the probability voltage, determines, on a random basis, if the event did, or did not, occur.

The invention will be better understood from the following description, and the drawings, in which.

Figure 1:
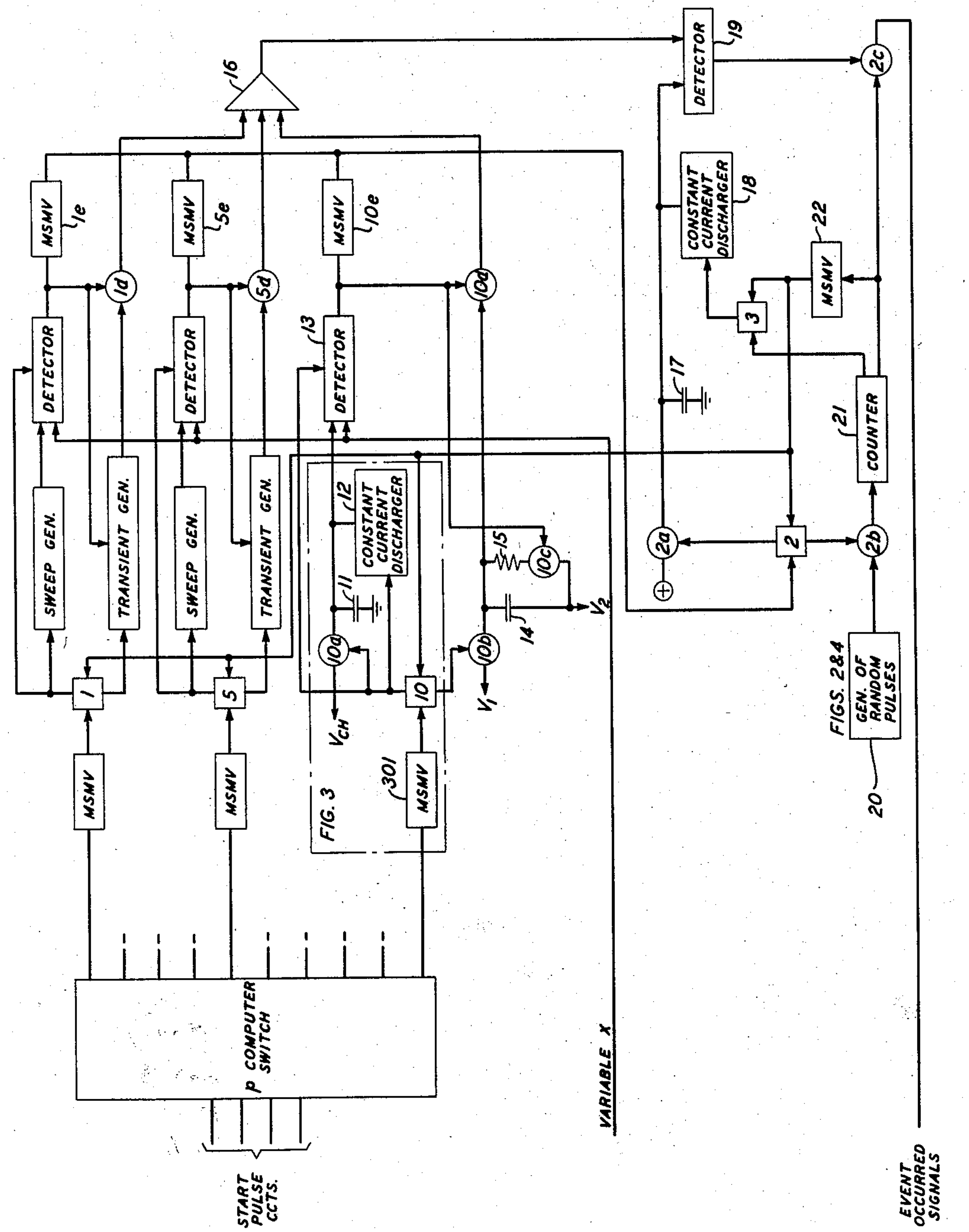
Fig. 1 is a block schematic of a system embodying the invention.

Figs. 9*a*, 9*b*, 9*c* and 9*d* show the probability curves.

The output of a source of noise voltage, when limited to a predetermined band of frequencies, is used to obtain a random element. The random element used in the present system is the time interval between zeros of the same sign of the noise voltage, where the sign of a zero is the sign of the slope of the noise voltage as it passes through zero. In the following description, the zeros mentioned are all of the same sign. Two zeros will practically always occur in the period of the lowest frequency; thus, the probability of the occurrence of two zeros in this time interval is essentially unity. Two zeros will practically never occur in a time interval shorter than the period of the highest frequency; thus, the probability of the occurrence of two zeros in this time interval is essentially zero. It may also be shown that the probability of the occurrence of two zeros in a time interval decreases exponentially with decrease in the time interval.

Hence, the probability that the time interval between zeros exceeds a particular time interval is related to the length of the particular time interval. By this means, a binary event—with one possibility being that the interval between zeros is greater than the particular interval, the only other possibility being that the interval between zeros is less than the particular interval—may be related to the possibility that an event to be simulated occurs by making the particular time interval equal to the probability of the occurrence of the event.

Certain conventions in terminology are employed throughout the descriptive material with regard to the gate circuits. A gate is said to be open when the gate is conducting or the information flows through the gate. A gate is said to be closed or shut when there is no conduction through the gate or no information flows through the gate.

The probability computer, or p-computer, generates a voltage related to the probability of the occurrence of the event. The first zero initiates the discharge of a capacitor through a constant-current discharge path. The linearly decreasing potential across the capacitor is compared with the voltage from the p-computer, and, when equality between these voltages is attained, the comparator opens a gating device. If the second zero occurs after the gate has been opened, a signal is passed through the gate, denoting that the event has occurred; if the second zero occurs before the gate opens, no signal will pass, denoting that the event has not occurred. The operation of the system can, if desired, be modified so that the gate is opened by a pulse corresponding to the second zero, and a signal originated by equality of the voltages in the comparator is applied to the gate; under these conditions, the appearance of a pulse in the output circuit of the gate is taken as evidence that the event has not occurred. Another modification of the first system is one in which the gate is opened by a pulse corresponding to the first zero and remains open until equality between the voltage across the capacitor and the voltage from the p-computer is reached; the occurrence of a second zero during the time the gate is open is registered as indicating that the event has not occurred.

A pulse, originated by the second zero, and delayed for a time interval less than the period of the highest frequency, restores the system to the quiescent state, to prevent erroneous operation by pulses due to later zeros.

Figure 9A:
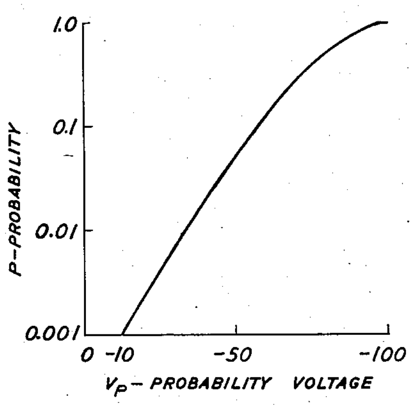

The relationship between the magnitude of the probability voltage and the probability that the event has occurred may be determined by a mathematical analysis of the system. Preferably, the system is calibrated by applying known magnitudes of the probability voltage, and registering the number of operations of the system, and the number of signals passed through the gate to determine the probability for each magnitude. As the system can operate to make many determinations per second, such a calibration may be made in a comparatively short time. A typical calibration curve for a system of this character is shown in Fig. 9A, where the probability that the event occurs is plotted against the probability voltage. This curve determines the voltage which the p-computer must produce to obtain a given probability.

Figure 9B:
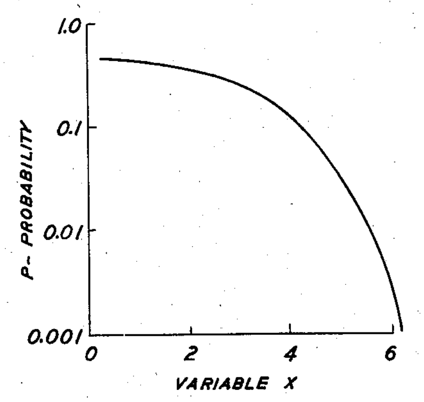
Figure 9C:
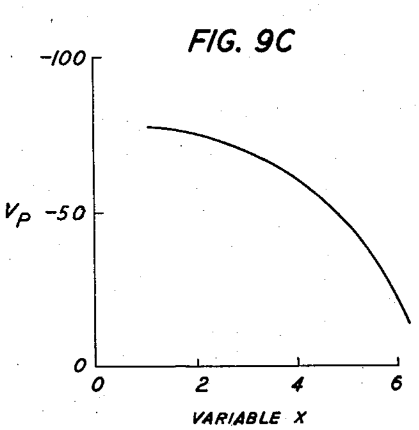

Fig. 9B discloses a probability curve which is typical of the curves relating to problems of this character. In Fig. 9B, given a process in which the probability of the occurrence of a specific event is a function of a single independent variable, the probability that the event occurs is plotted against the independent variable, herein referred to as variable X. Combining Figs. 9A and 9B, Fig. 9C shows the probability voltage plotted against the variable X. This curve may be simulated electrically, by expressing the variable X in terms of an arbitrary time scale, and constructing a network of resistance and capacitance or inductance or both to produce the indicated variation in voltage. In this problem, a probability of less than .001 is not of practical interest, thus the curve of Fig. 9C may be converted to the curve of Fig. 9D, by expressing variable X in terms of time and starting with zero time at the value of variable X where $p=.001$, which, from Fig. 9A is when $V_p=-10$ volts. Thus zero time on this arbitrary time scale represents a large value of variable X where $p=.001$, and the maximum value of time shown represents a small value of variable X where $p$ has its maximum value. This requires that the voltage $V_p$ be $-10$ volts at zero time and that this voltage increase negatively with time toward the voltage corresponding to the maximum probability of success. In order to clarify this change of scale, a variable X scale is also shown on Fig. 9D. It will be noted that the curve of Fig. 9D resembles the exponential curve of the discharge of a simple resistance-capacitance combination, thus such a network may be proportioned to produce a close approximation to this curve. A closer match to certain curves may be obtained by using a resistor with a non-linear voltage-current relation.

Figure 9D:
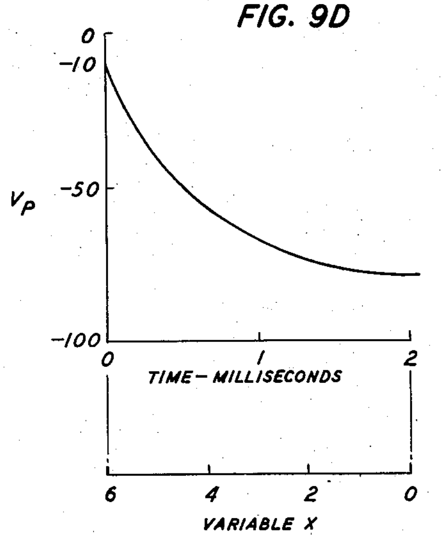

It will be seen that the method disclosed herein requires that the curve of Fig. 9D either falls continuously or rises continuously.

In Fig. 1, the start pulse circuits are connected to computers for four process sources, which originate pulses indicating that an operation has taken place, and supply, to the variable X connection, a voltage representing the value of variable X at which the operation takes place. The p-computer switch, which may be of the type disclosed in United States patent application Serial No. 165,053, filed May 29, 1950, by W. H. MacWilliams, Jr., now Patent 2,627,039, granted January 27, 1953, routes the pulse to the p-computer which is designed to have the appropriate probability curve. A number of p-computers having different probability characteristics may be provided, and, in the present case, the tenth p-computer will be assumed to have been selected. Likewise, a given p-computer may be connected to more than one operation channel.

The capacitor 11 is charged through the gate 10*a* to the voltage V*ch*; the lower plate of capacitor 14 is held at a voltage $V_2$, and this capacitor is charged through the gate 10*b* to a voltage $V_1$, the charge leaking off through resistor 15 and gate 10*c*. The start pulse energizes a monostable, or single-shot, multivibrator 301, which in turn energizes the bistable multivibrator 10, which shuts the gates 10*a*, 10*b*, disconnecting capacitors 11 and 14 from V*ch* and $V_1$, respectively, enables the detector 13, and starts the constant-current discharger 12. The variable X voltage is supplied to the detector 13, and, when the voltage across the capacitor 11 has linearly decreased to equality with the variable X voltage, the detector 13 closes the gate 10*c*, stopping the discharge of capacitor 14 and opens the gate 10*d* so that the voltage across capacitor 14 is supplied to the isolating device 16. The discharge of capacitor 11 linearly down to equality with the variable X voltage thus has measured the time interval, proportional to the difference between the value of variable X where $p=.001$ and the value of variable X when the operation occurred, during which capacitor 14 has discharged through resistor 15 and gate 10*c*. The voltage across capacitor 14 is supplied through gate 10*d* and device 16 to the detector 19.

Capacitor 17 is charged from a suitable source through the gating device 2*a*. The operation of detector 13 energizes the monostable multivibrator 10*e* to apply a voltage energizing the bistable multivibrator 2 which shuts the gate 2*a*, cutting off the charging circuit of capacitor 17, and opens gate 2*b*. A pulse, corresponding to the first zero, can then be transmitted from the source of random pulses 20 through the gate 2*b* and the counter 21 to energize the bistable multivibrator 3 which operates the constant-current discharge device 18. The voltage across capacitor 17 is supplied to detector 19, and capacitor 17 will discharge linearly to equality with the probability voltage supplied by the device 16, thus measuring a particular time interval which is a function of the probability of the occurrence of the event. Detector 19 maintains gate 2*c* in a closed condition as long as the magnitude of the voltage across capacitor 17 is greater than that from device 16. When the magnitude of the voltage across capacitor 17 becomes equal to and falls below that of the output of device 16, the output of detector 19 changes and gate 2*c* is opened. If the pulse, corresponding to the second zero, is supplied by the counter 21 to the gate 2*c* after the gate has been opened, a signal will be transmitted signifying that the event has occurred, but, if this pulse occurs before the gate 2*c* has been opened, no signal will be given.

In other words, if the random time interval between the occurrence of two successive zeros is greater than the particular time interval corresponding to the probability of the occurrence of the event, a signal will be given, signifying that the event has occurred; but if the random time interval is less than the particular time interval, no signal will be given.

The second pulse is supplied to the monostable multivibrator 22. After a short delay, the multivibrator 22 applies a momentary voltage to restore multivibrator 3, cutting off the constant-current discharger 18; to restore multivibrator 2, opening gate 2*a* and closing gate 2*b*; to restore multivibrator 10, opening gates 10*a*, 10*b*, cutting off the constant-current discharger 12, and disabling the detector 13. The disablement of detector 13, opens gate 10*c* and closes gate 10*d*, restoring the circuit to normal.

In order to shorten and simplify the following detailed description of the various circuits, a vacuum tube which is connected so that a large current flows from anode to cathode will be designated "on"; and, a vacuum tube which is connected so that little, or no, current flows from anode to cathode will be designated "off."

Figure 3:
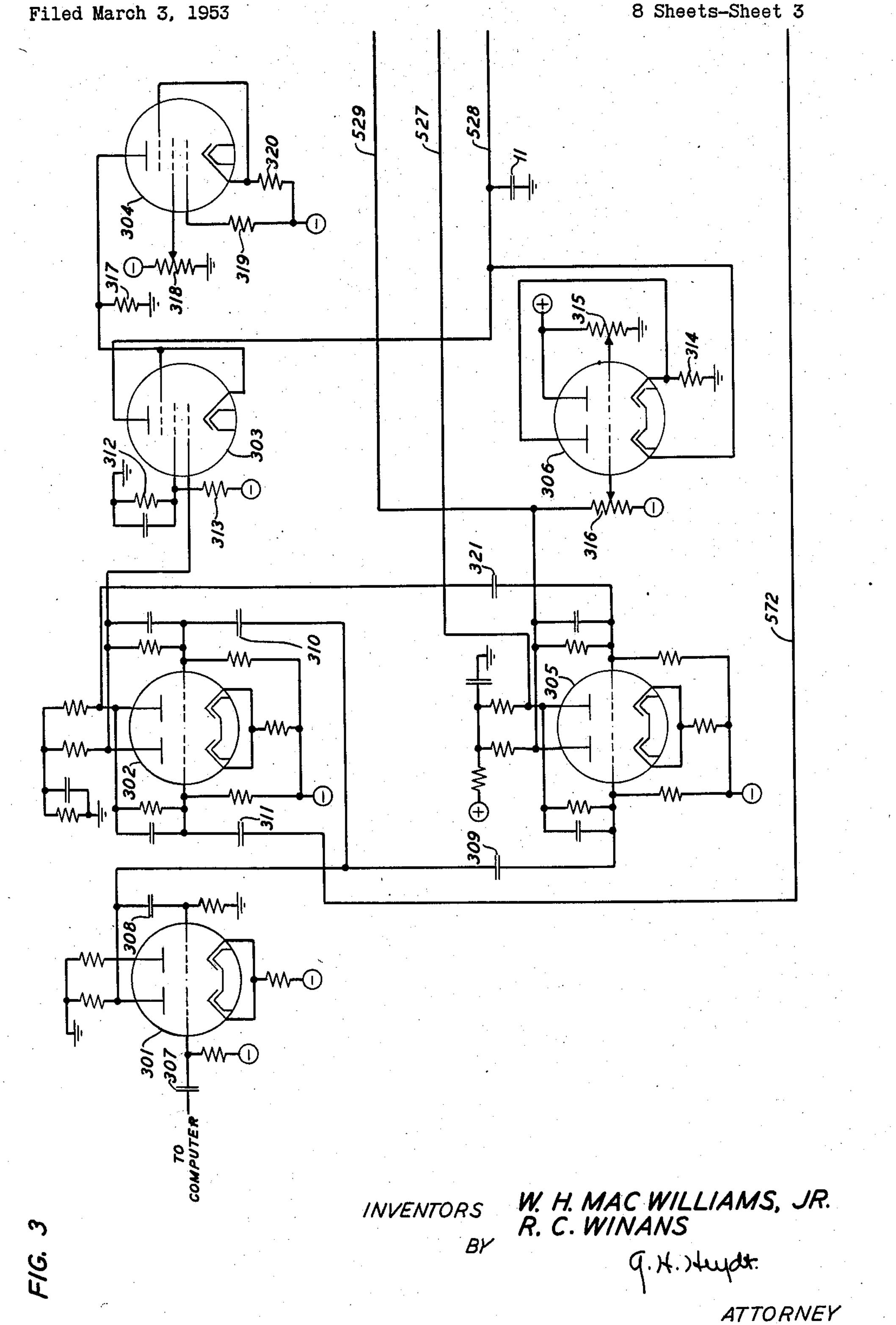
Fig. 3 shows the input circuit of the p-computer and the timing capacitor.

The positive pulse from the start pulse circuit is transmitted through the p-computer switch, and supplied to the small capacitor 307, Fig. 3. Tube 301, Fig. 1, is connected to form a monostable, or single-shot, multivibrator, and, in the stable condition, the left triode is off, and the right triode is on. The incoming pulse applies a positive voltage to the control grid of the left triode of tube 301, through capacitor 307, turning on this triode; and the resultant drop in the anode voltage is applied through capacitor 308 to the control grid of the right triode, cutting off the right triode, and permitting capacitor 308 to begin charging. A short time thereafter, when capacitor 308 has charged to a point where the control grid of the right triode renders the right triode conducting, the resulting rise of the common cathode potential reduces the conduction in the left triode, applying a positive voltage from the anode of the left triode through capacitor 308 to the control grid of the right triode, increasing the conduction in this triode, thus through the common cathode potential turning the left triode off and restoring the circuit to the stable condition.

When the left triode of tube 301 is cut off, the anode voltage will rise and supply a positive potential through capacitor 310 to the control grid of the right triode of tube 302 and through capacitor 309 to the control grid of the left triode of tube 305. Thus, in effect, the incoming pulse has been delayed for a short interval in order to insure that the variable X voltage has been supplied to the p-computer.

Tube 306 corresponds to the charging gate 10*a*, Fig. 1. The anode of the right triode of tube 306 is connected to the anode supply, the cathode of this tube is connected through resistor 314 to ground and to the anode of the left triode of tube 306, and the control grid of the right triode is connected to potentiometer 315 connected across the anode supply. The control grid of the left triode of tube 306 is connected to potentiometer 316, which is connected between the anode of the left triode of tube 305 and a negative supply voltage. Current from the anode supply will flow from anode to cathode of the right triode of tube 306, thence from anode to cathode of the left triode of tube 306 and through capacitor 11 to ground, thus charging capacitor 11. By adjustment of the brush of potentiometer 315, the potential of the cathode of the right triode of tube 306, which is $V_{ch}$ in Fig. 1, and the potential across capacitor 11, may be adjusted to a desired value.

Tubes 302 and 305 correspond to the device 10, Fig. 1. Tube 305 forms a bistable multivibrator, or flip-flop, with the left triode normally off, and the right triode normally on. The positive pulse from tube 301 is supplied through capacitor 309 to the control grid of the left triode of tube 305, initiating conduction in this triode, and causing the conduction in the right triode to be cut off. The decrease in potential of the anode of the left triode of tube 305 applies a negative potential to the control grid of the left triode of tube 306 through potentiometer 316, thus cutting off the charging current to the capacitor 11.

Tube 302 also forms a bistable multivibrator, with the left triode on, and the right triode off. When tube 301 operates, a positive voltage is applied through capacitor 310 to the control grid of the right triode of tube 302, causing this triode to conduct and to cut off the conductivity in the left triode. When the right triode of tube 302 is turned on, the consequent drop in the anode voltage of this triode applies a negative voltage through capacitor 321 to the control grid of the right triode of tube 305, to couple together the multivibrators formed by tubes 302 and 305. When the left triode of tube 302 is cut off, a positive voltage is applied to the first grid of tube 303. The second grid of tube 303 is connected to the potential divider formed of resistors 312 and 313, connected across the negative voltage supply, and normally is biased so as to cut off the conduction through the tube. However, when a positive voltage is applied to the first grid of tube 303, this tube becomes conductive. The anode of tube 303 is connected to one plate of capacitor 11, the cathode of tube 303 being connected to the anode of tube 304. The cathode of tube 304 is connected through resistor 320 to the negative voltage supply, the first grid of tube 304 is connected through resistor 319 to the negative voltage supply, and the second grid is connected to a potentiometer 318 connected across the negative voltage supply. The combination of tube 303 and tube 304 functions as a gated constant-current device, the value of the current transmitted being regulated by the setting of the potentiometer 318, and corresponds to the constant-current discharger 12, Fig. 1. Thus, when tube 303 becomes conductive, the capacitor 11 can discharge through tubes 303 and 304 at a constant rate. Hence the operation of tube 301 operated tube 305 to isolate capacitor 11 from the charging source, namely the cathode of the right triode of tube 306, and also operated tube 302 to cause tube 303 to conduct, thus permitting the capacitor 11 to discharge through tubes 303 and 304 at a constant rate.

Figure 5:
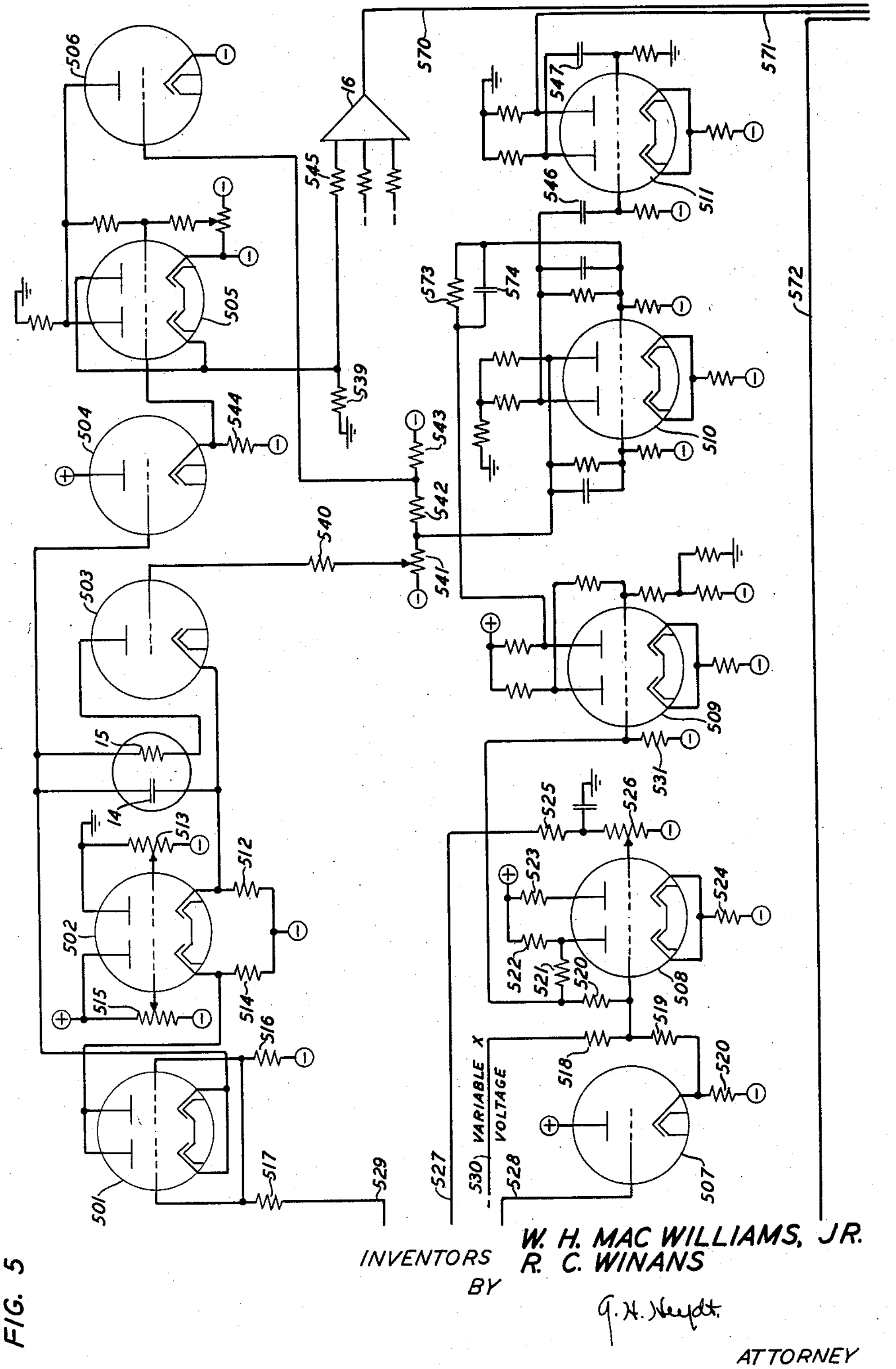
Fig. 5 shows the probability voltage generator, and the gate and detector circuits.

Tube 501 corresponds to gate 10*b* of Fig. 1, the left triode of tube 502 is the source of voltage $V_1$ of Fig. 1 and the right triode of tube 502 is the source of voltage $V_2$ of Fig. 1. The anode of the right triode of tube 502, Fig. 5, is connected to ground, the cathode through resistor 512 to the negative voltage supply, and the control grid is connected to potentiometer 513, connected across the negative voltage supply, so that the cathode may be maintained at a desired negative potential, namely potential $V_2$ in Fig. 1. The anode of the left triode of tube 502 is connected to the anode supply, the cathode of this triode is connected through resistor 514 to the negative voltage supply, and the control grid is connected to potentiometer 515 connected across both the negative voltage supply and the anode supply. Thus the cathode of this triode may be maintained at a negative or positive potential with respect to ground, namely voltage $V_1$ of Fig. 1. In a specific embodiment of the invention, the cathode of the left triode of tube 502 was maintained at ground potential, while the cathode of the right triode was maintained 100 volts negative with respect to ground. The cathode of the left triode of tube 502 is connected to the anodes of tube 501, while the cathodes of tube 501 are connected to one plate of capacitor 14, the other plate of capacitor 14 being connected to the cathode of the right triode of tube 502 and the cathode of tube 503. The control grids of tube 501 are connected through resistor 516 to the negative voltage supply, and also through resistor 517 to the plate of the left triode of tube 305 which is normally at a positive potential, so that tube 501 normally is conducting. Capacitor 14 thus is charged from the cathode of the left triode of tube 502 through the anode-cathode path of tube 501 through condenser 14 to the cathode of the right triode of tube 502. One plate of capacitor 14 is connected through resistor 15 and the anode-cathode path of tube 503 to the other plate, thus the charge of capacitor 14 is continually leaking off through tube 503.

Tubes 507, 508, correspond to detector 13, Fig. 1. The anode of the left triode of tube 508 is connected through resistor 522 to the anode supply, the cathodes of this triode are connected through resistor 524 to the negative voltage supply, and the control grid is connected through the feedback resistors 520 and 521 to the anode. The anode of the right triode of tube 508 is connected through resistor 523 to the anode supply and the control grid is connected to potentiometer 526 which is connected to the negative voltage supply. Normally the right triode of tube 508 functions as a compensating tube of the type disclosed in United States Patent 2,308,997, January 19, 1943, S. E. Miller. However, one end of potentiometer 526 is connected through resistor 525 and connection 527 to the anode of the right triode of tube 305, Fig. 3, and in the unoperated condition of tube 305 the potential of this connection is such as to render tube 508, Fig. 5, inoperative. However, when tube 305 operates, connection 527 becomes positive, and adjusts the potential of the control grid of the right triode of tube 508, Fig. 5, so that tube 508 is fully operative. The anode of tube 507 is connected to the anode supply, and the cathode is connected through resistor 520 to the negative voltage supply. The cathode is also connected through resistor 519 to the control grid of the left triode of tube 508. One plate of capacitor 11, Fig. 3, is connected by connection 528 to the control grid of tube 507, Fig. 5, and produces a corresponding voltage across resistor 520 which is applied through resistor 519 to the control grid of the left triode of tube 508. The variable X voltage is supplied from the computer by connection 530 and the resistor 518 also to the control grid of the left triode of tube 508.

When tube 301, Fig. 3, restores, tube 305 is operated, cutting off the conductivity of tube 306 and thus stopping the charging of capacitor 11, and enabling the detector 508, Fig. 5, and also applying a negative voltage through connection 529 and resistor 517 to cut off the conductivity of tube 501, Fig. 5, stopping the charging of capacitor 14; and at the same time tube 302, Fig. 3, is operated, opening the gate tube 303 to permit capacitor 11 to discharge at a constant rate.

Tube 50 is connected as a simple two-stage direct-current amplifier.

Tube 510 forms a bistable multivibrator, or flip-flop, with the left triode normally on, and the right triode off. When the voltage across capacitor 11 supplied through tube 507 and resistor 519 falls to equality with the variable X voltage, as supplied through resistor 518, the junction of resistors 520 and 521 will apply a positive voltage which is amplified in tube 509 and applied to the control grid of the right triode of tube 510 through resistor 573 and capacitor 574 in parallel turning this triode on, and cutting off the left triode. The control grid of tube 503 is connected through resistor 540 to potentiometer 541, having a winding connected from the negative voltage supply to the anode of the right triode of tube 510, and, as in the quiescent condition, the anode of the right triode of tube 510 is at a low negative potential, the brush of potentiometer 541 is adjusted so that tube 503 conducts normal current. When the right triode of tube 510 is turned on, the anode potential becomes more negative with respect to ground, thus applying an added potential to the control grid of tube 503 cutting off the conduction of current through this tube, and stopping the discharge of capacitor 14. The anode of tube 504 is connected to the anode supply, the cathode is connected through resistor 544 to the negative voltage supply and the control grid is connected to capacitor 14. Tubes 505 and 506 are connected to form a switch of the type shown in United States Patent 2,570,225, October 9, 1951, J. H. Felker, the left triode of tube 505 corresponding to tube 10 in the patent, the right triode corresponding to tube 20, and tube 506 corresponding to tube 30 in the patent, and correspond to the gate **10*d*, Fig. 1. The cathode of the left triode of tube 505 is connected through resistor 539 to ground and through resistor 545 to the input circuit of an isolating amplifier 16. The anode of the right triode of tube 510 is connected through resistor 542 to the control grid of tube 506, and then through resistor 543** to the negative voltage supply.

The voltage across capacitor 14 thus is repeated by tube 504 and applied to the gating tube 505. When tube 510 is operated, a negative voltage from the anode of the right triode of tube 510 is applied through resistor 542 to the control grid of tube 506 cutting off the conduction in this tube and permitting the voltage across resistor 544 to be repeated across resistor 539, and thus supplied through resistor 545 to the isolating device 16. The isolating device 16 is a conventional feedback amplifier, connected so that the polarity of the input is unchanged, and the amplification is substantially unity. The output voltage of the isolating device 16, which has an amplitude proportional to $V_p$, is supplied over connection 570, Figs. 5, 6 and 7, through resistor 714 to the control grid of the right triode of tube 707.

Tube 511, Fig. 5, is connected to form a monostable, or single-shot multivibrator, with the left triode cut off and the right triode on, and corresponds to device **10*e*, Fig. 1. When tube 510 operates, a positive voltage is supplied through capacitor 546 to the control grid of the left triode of tube 511, causing this triode to conduct and to apply a negative voltage through capacitor 547 to the control grid of the right triode cutting off this triode and applying a positive voltage to connection 571. After a short time interval to insure that the gate formed of tubes 505, 506 has operated to supply the voltage $V_p$, corresponding to the potential difference across capacitor 14, to the connection 570, tube 511 will return to its normal condition, removing the positive potential from connection 571, Figs. 5, 6, 7, applying a negative pulse to the control grid of the right triode of tube 701, Fig. 7, through capacitor 715**.

Thus, the incoming pulse energized tube 301, Fig. 3, which energized tube 302 to open the gate 303, permitting capacitor 11 to discharge at constant current through tubes 303, 304; and also energized tube 305, which closed the gate 306, cutting off the charging circuit of capacitor 11, and also closed the gate 501, Fig. 5, cutting off the charging circuit of capacitor 14, which discharges through resistor 15 and tube 503. When the potential difference across capacitor 11, as repeated by tube 507, falls to equality with the variable X voltage, tubes 509, 510, 503 are energized to cut off the discharge of capacitor 14, and the gate 504, 505, 506 is opened so that the potential difference across capacitor 14 may be applied through device 16 to connection 570. The discharge of capacitor 11 thus measured the time interval during which capacitor 14 was permitted to discharge. Tube 510 also energizes tube 511 which, after a short time interval, supplies a negative voltage change to connection 571 to signal that the proper value of $V_p$, the potential across capacitor 14, has been selected.

Figures 2, 8:
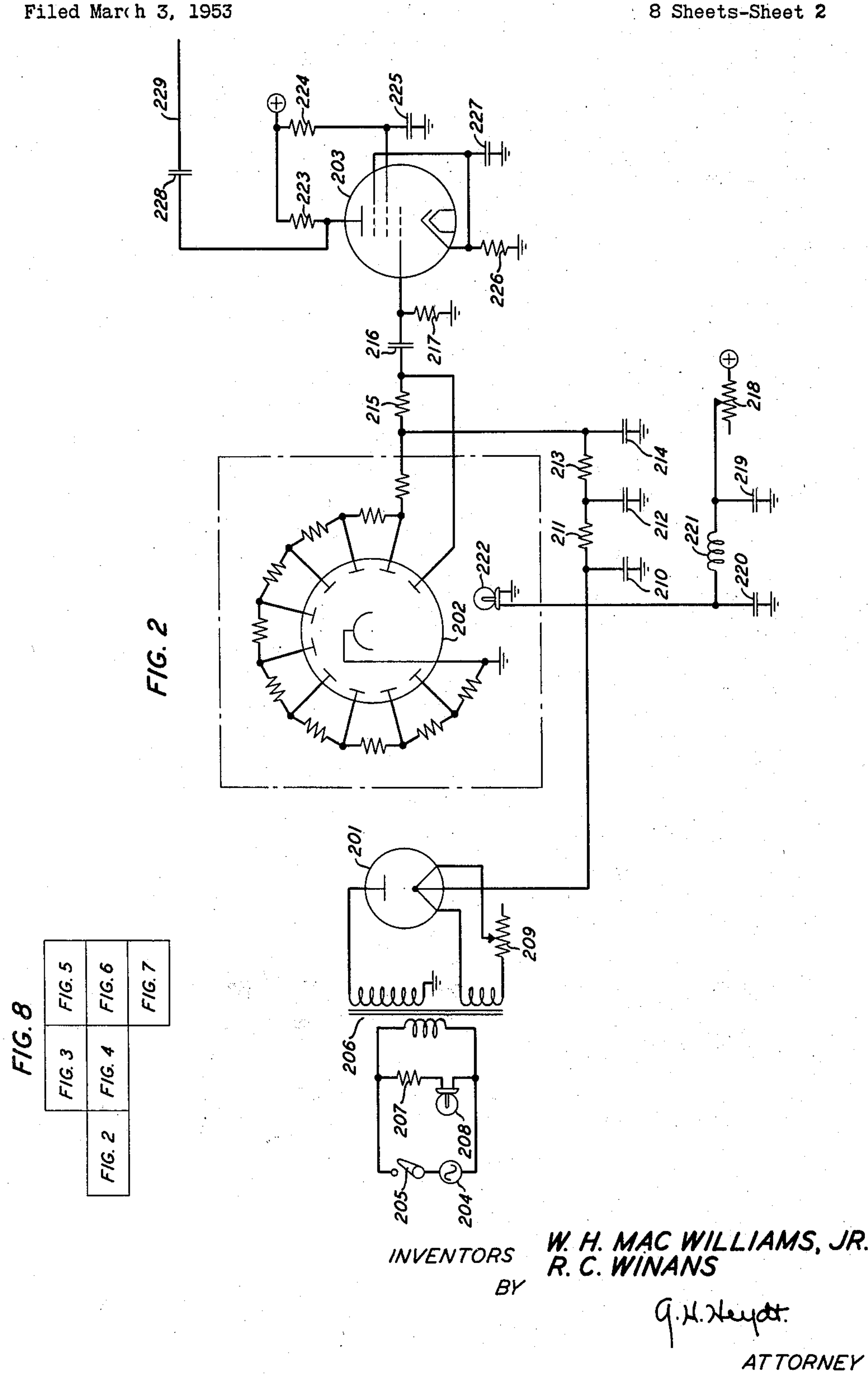
Fig. 2 is a generator of noise voltages.
Fig. 8 shows the interconnections of Figs. 2 to 7.

In Fig. 2 a source of power 204 can be connected through the switch 205 to the primary of transformer 206. The resistor 207 and lamp 208 are connected across the primary of the transformer to indicate when the power is turned on. One secondary winding of transformer 206 is connected through rheostat 209 to energize the filament of the diode 201. A grounded secondary winding of transformer 206 is connected to the anode of tube 201. The rectified voltage is filtered by resistors 211, 213 and capacitors 210, 212, 214 and supplied to the potential divider supplying the anodes of the photoelectric electron multiplier 202. Current from a suitable source is supplied through rheostat 218 and the filter formed of inductor 221 and capacitors 219, 220 to a lamp 222 exciting the photoelectric element of the tube 202. The filters in the anode supply, and in the supply circuit of lamp 222 insure that the noise voltages will not contain any characteristic frequencies and will be purely random in magnitude. The noise voltages from tube 202, developed across resistor 215, are supplied through capacitor 216 to the control grid of tube 203, which is connected through resistor 217 to ground. The anode of tube 203 is connected through resistor 223 to the anode supply; the screen grid is connected through resistor 224 to the anode supply and through capacitor 225 to ground; and the cathode is grounded through resistor 226 and capacitor 227. The amplified noise voltages are supplied through capacitor 228 to connection 229.

Figure 4:
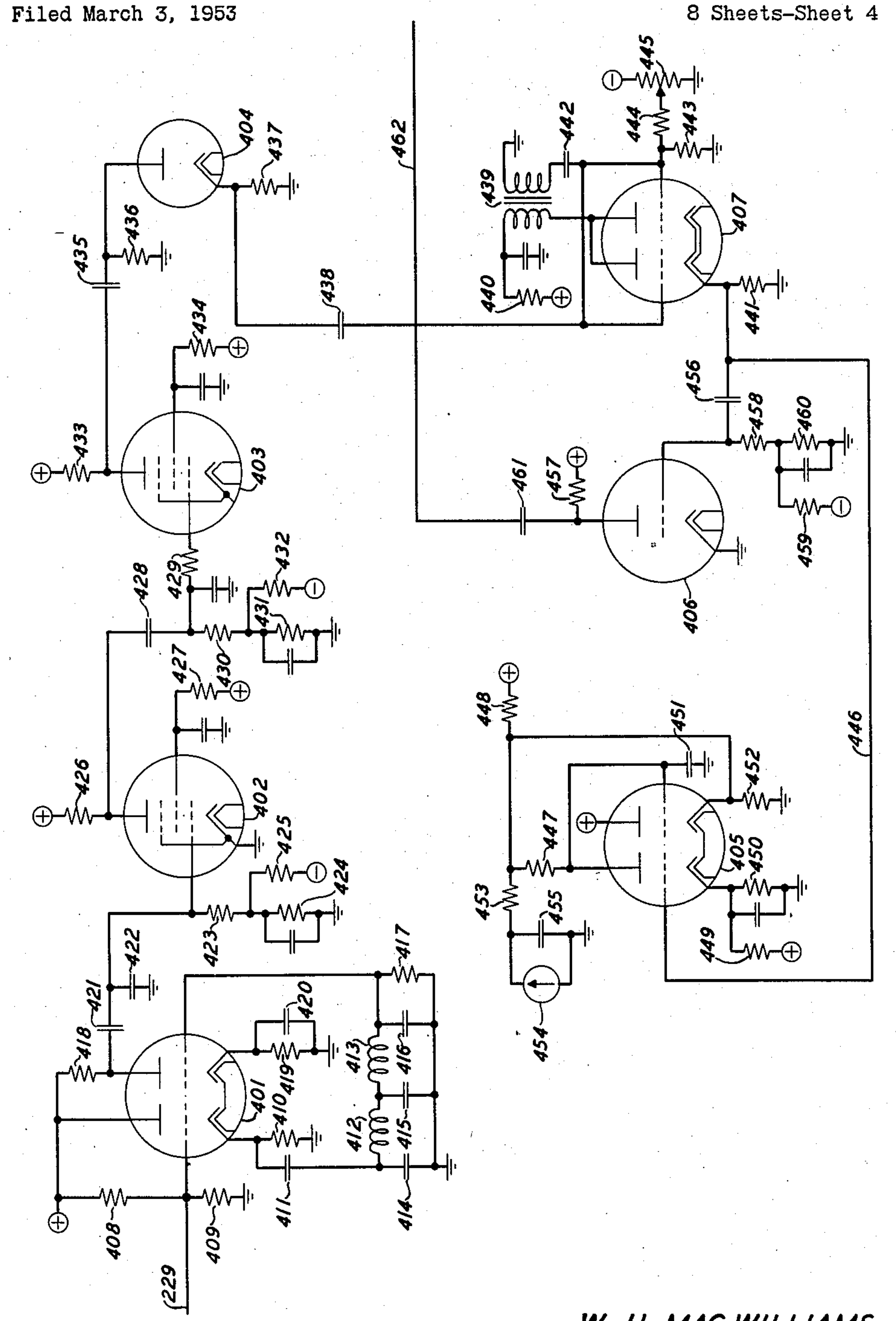
Fig. 4 shows the band filter for the noise voltages, and the pulse generator circuit.

Connection 229 is connected to the control grid of the left triode of tube 401, Fig. 4. The anode of the left triode of tube 401 is connected to the anode supply and the cathode is connected to ground through resistor 410, the control grid being biased from the potential divider formed of resistors 408, 409 connected from the anode supply to ground. The noise voltages developed across resistor 410 are supplied through capacitor 411 to the filter formed of inductors 412, 413, capacitors 414, 415, 416 and resistor 417, which together form a constant K low-pass filter, which may conveniently have a cut-off in the neighborhood of 8000 cycles per second. The filtered voltages developed across resistor 417 are supplied to the control grid of the right triode of tube 401. The anode of tube 401 is connected through resistor 418 to the anode supply; the cathode of tube 401 is connected to ground through resistor 419 and capacitor 420. The output voltage of the right triode of tube 401 is supplied through capacitor 421 to the control grid of tube 402. A small capacitor 422 connected from the control grid of tube 402 to ground aids in the elimination of high frequency voltages. The control grid of tube 402 is connected through resistor 423 to the potential divider, formed of resistors 424 and 425 connected from the negative voltage supply to ground; the cathode of tube 402 is grounded, the anode of tube 402 is connected through resistor 426 to the anode supply and the screen grid is connected through resistor 427 to the anode supply. The purpose of the two tubes 402 and 403 which are operating as class AB amplifiers, is to amplify that portion of the noise voltage around the zero axis and limit the consideration to this area. This is accomplished through the proper biasing of the tubes 402 and 403 slightly above cut-off. The result is a voltage so limited that substantially all of the changes in magnitude in this voltage are crossings of the zero axis, that is zeros as described earlier, these zeros at the plate of tube 403 being of both signs. Differentiation of this signal will then give a pulse at each zero with a sign corresponding to that of the zero. The interstage networks of tubes 401 and 402 are designed to discriminate against low frequencies, so that the frequency spectrum of the noise voltage is cut off at about 400 cycles per second. The anode of tube 402 is connected through capacitor 428 and resistor 429 to the control grid of tube 403. Bias voltage is supplied to the control grid of tube 403 through resistor 430 from the potential divider formed of resistors 431 and 432 connected across the negative voltage supply. The anode of tube 403 is connected through resistor 433 to the anode supply; the screen grid is connected through resistor 434 to the anode supply; and the cathode is grounded. The anode of tube 403 is connected through a small capacitor 435 to the anode of the diode 404, and through resistor 436 to ground. The cathode of the diode 404 is connected through resistor 437 to ground. The capacitor 435 and resistor 436 differentiate the voltage at the anode of tube 403, the negative pulses passing to ground through resistor 436 and the positive pulses passing through tube 404 and resistor 437 to ground. Thus only the zeros of a single sign of the noise voltage will produce voltages across resistor 437.

The anodes of tube 407 are connected through one winding of transformer 439 and resistor 440 to the anode supply; the cathodes of tube 407 are connected to ground through resistor 441; the control grids of tube 407 are connected through capacitor 442 and the other winding of transformer 439 to ground, through resistor 443 to ground, and through resistor 444 to potentiometer 445 connected across the negative voltage supply. Tube 407 is thus connected as a conventional blocking oscillator. When a pulse is transmitted from the cathode of tube 404 through capacitor 438 to the control grid of tube 407, a voltage of fixed amplitude and duration will be developed across resistor 441. Potentiometer 445 may be adjusted to determine the minimum amplitude of the voltage pulse from tube 404 which will cause tube 407 to oscillate.

The cathodes of tube 407 are connected by connection 446 to the control grid of the left triode of tube 405. The anode of the left triode of tube 405 is connected through resistors 447 and 448 to the anode supply, and cathode of the left triode of tube 405 is connected to the potential divider formed of resistors 449 and 450 connected across the anode supply. The anode of the left triode of tube 405 is connected directly to the control grid of the right triode, which is connected to ground through capacitor 451. The anode of the right triode of tube 405 is connected directly to the anode supply, and the cathode is connected to ground through resistor 452. The cathode of the right triode of tube 405 is also connected to ground through resistor 453 and meter 454, the meter 454 being shunted by capacitor 455. The voltage pulses from the cathode of tube 407 are of fixed amplitude and fixed duration but have a random occurrence in time, and each pulse will supply through tube 405 an increment of current to capacitor 455. The reading of meter 454 will thus be a measure of the average period of the random pulses.

The voltage developed across resistor 441 is supplied through capacitor 456 to the control grid of tube 406. The anode of tube 406 is connected through resistor 457 to the anode supply, the cathode is grounded and the control grid is connected through resistor 458 to the potential divider formed of resistors 459, 460 connected across the negative voltage supply. The anode of tube 406 is connected through capacitor 461 to connection 462.

The apparatus shown in Figs. 2 and 4 thus corresponds with the generator of random pulses 20, Fig. 1.

Figure 6:
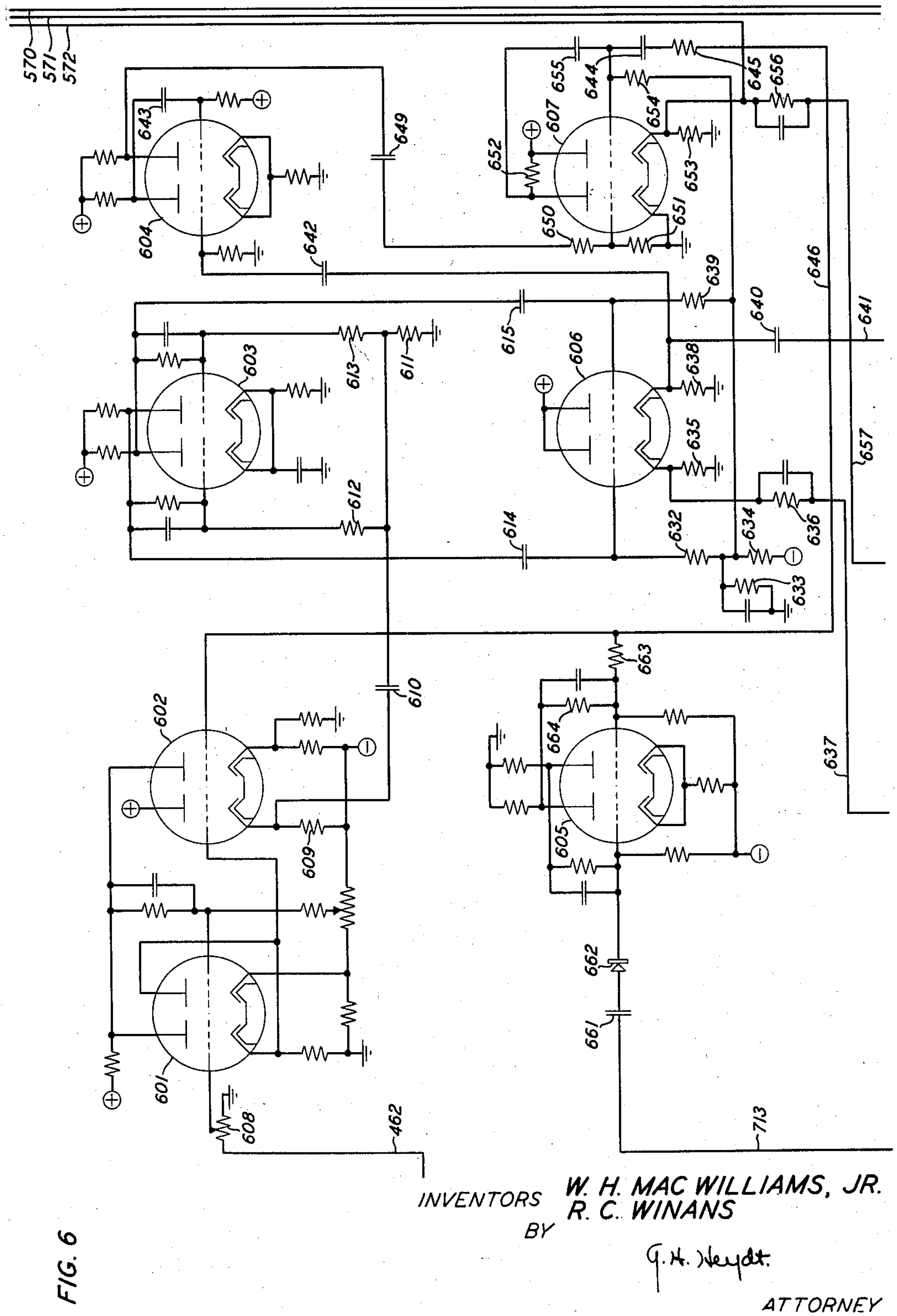
Fig. 6 shows the pulse gate and counter circuits.

The pulses from tube 406 are supplied over connection 462 to the winding of potentiometer 608, Fig. 6. The brush of potentiometer 608 is connected to the control grid of the left triode of tube 601. The two triodes of tube 601 and the right triode of tube 602 together form a gate of the type disclosed in United States Patent 2,570,225, October 9, 1951, J. H. Felker, the left triode of tube 601 corresponding to tube 10 in the patent, the right triode of tube 601 corresponding to tube 20, and the right triode of tube 602 corresponding to tube 30. The cathode of the left triode of tube 601 is connected to the control grid of the left triode of tube 602, the anode of this triode being connected directly to the anode supply, and the cathode being connected through resistor 609 to the negative voltage supply, the left triode of tube 602 thus operating as a cathode follower of the voltages developed at the cathode of the left triode of tube 601. The gate formed of tubes 601, 602, corresponds to the gate 2*b* in Fig. 1.

The control grid of the right triode of tube 602 is connected to the output of the bistable multivibrator 605, which corresponds to the multivibrator 2, Fig. 1. As explained hereinafter, the bistable multivibrator 605 is operated when the amplitude of the probability voltage $V_p$ has been determined, and the operation of the multivibrator 605 opens the gate formed of tubes 601 and 602, and permits the voltages developed across resistor 609 to be applied through capacitor 610 to resistor 611.

Tube 603 is connected as a bistable multivibrator in which the left triode is normally cut off, and the right triode is on. The control grid of the left triode of tube 603 is connected through resistor 612 to the upper end of resistor 611, while the control grid of the right triode is connected through resistor 613, also to resistor 611. The first positive pulse transmitted through capacitor 610 will drive the control grid of the left triode of tube 603 positive, thus causing the left triode to become conductive, and the resultant decrease in the anode potential of this triode will apply a negative voltage to the control grid of the right triode, cutting off the conductivity in this triode. When the conductivity of the right triode of tube 603 is cut off the anode potential will rise and apply a positive pulse through capacitor 614 to the control grid of the left triode of tube 606. The anode of the left triode of tube 606 is connected directly to the anode supply, the cathode is connected to ground through resistor 635 and the control grid is connected through resistor 632 to the potential divider formed of resistors 633 annd 634 connected across the negative voltage supply. The positive pulse transmitted through capacitor 614 will thus cause an increase in voltage across resistor 635 which is supplied through resistor 636 to connection 637.

The second pulse transmitted through capacitor 610 will drive the control grid of the right triode of tube 603 positive causing this triode to become conductive and to cut off the conductivity of the left triode of tube 603. When the conductivity of the left triode of tube 603 is cut off the anode voltage will rise and supply a positive voltage through capacitor 615 to the control grid of the right triode of tube 606. The anode of the right triode of tube 606 is connected to the anode supply, the cathode is connected through resistor 638 to ground and the control grid is connected through resistor 639 to the potential divider formed of resistors 633 and 634. The pulse transmitted through capacitor 615 causes a rise in the voltage across resistor 638 which is transmitted through capacitor 640 to connection 641, and through capacitor 642 to the control grid of the left triode of tube 604. Tube 604 is connected to form a monostable, or single-shot, multivibrator, in which, in the quiescent state, the left triode of tube 604 is cut off, and the right triode is on. When a positive pulse is transmitted through capacitor 642 to the control grid of the left triode of tube 604, this triode will become conductive and the resultant decrease in the anode voltage of this triode is transmitted through capacitor 643 to the control grid of the right triode cutting off the conductivity in this triode. Capacitor 643 will then recharge and eventually the right triode of tube 604 will again conduct, cutting off the conduction in the left triode. The resultant decrease in voltage of the anode of the right triode of tube 604 will send a negative pulse through capacitor 649 and resistor 650 to the control grid of the left triode of tube 607. The anode of the left triode of tube 607 is connected through resistor 652 to the anode supply, the cathode of this triode is grounded and the control grid is connected through resistor 651 to ground. The anode of the right triode of tube 607 is connected to the anode supply, the cathode is connected to ground through resistor 653 and the control grid is connected through resistor 654 to the potential divider formed of resistors 633 and 634. The anode of the left triode of tube 607 is connected through a small capacitor 655 to the control grid of the right triode, thus when the right triode of tube 604 returns to the conducting state, the negative potential change of the anode of the right triode of tube 604 is transmitted through capacitor 649 and resistor 650 to the control grid of the left triode of tube 607, causing the anode potential of the left triode of tube 607 to go positive, the potential change being differentiated by capacitor 655 and resistor 654 to apply a positive voltage pulse to the control grid of the right triode of tube 607. This positive voltage pulse will cause an increase in the voltage across resistor 653 which is delayed by a short time from the voltage change appearing across resistor 638, and which is supplied to connection 572 and through resistor 656 to connection 657.

Thus the first pulse through the gate formed by tubes 601 and 602 produced a positive pulse on connection 637; the second pulse produced a positive pulse on connection 641, and was delayed in tube 604 for a time interval less than the period of the highest frequency in the band limited noise voltage and then repeated as a delayed second pulse on connection 657.

Tubes 603 and 606 thus correspond to the counter 21, Fig. 1, and tubes 604 and 607 thus correspond to MSMV22, Fig. 1.

Figure 7:
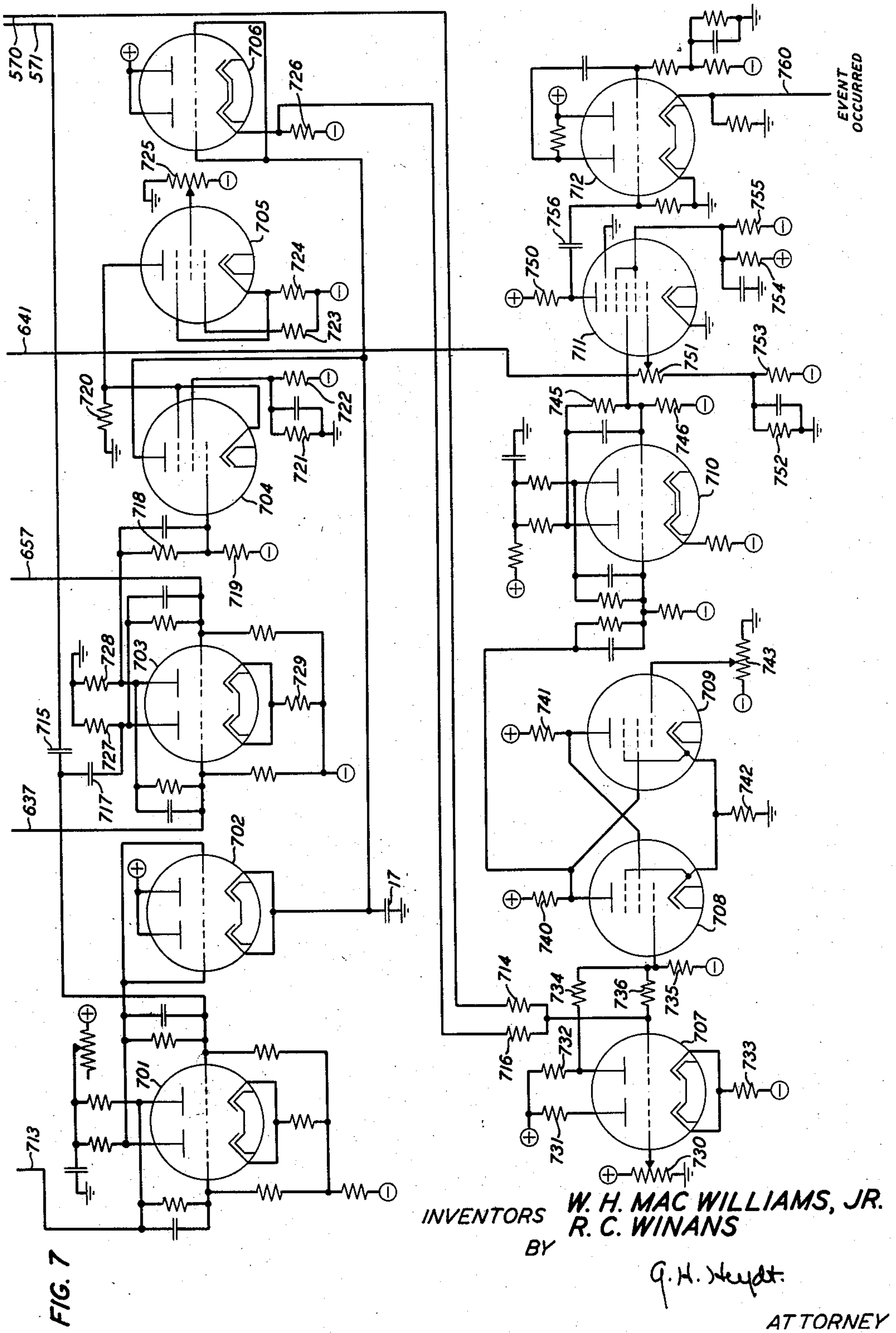
Fig. 7 shows the probability capacitor with charging and discharging circuits, and the detector and signal circuits.

Tube 701, Fig. 7, is connected to form a bistable multivibrator, or flip-flop, with the left triode off and the right triode on, and corresponds to part of device 2, Fig. 1.

The restoration of tube 511, Fig. 5, removes the positive potential from connection 571, and this change in potential is differentiated by the small capacitor 715, Fig. 7, to apply a negative pulse to the control grid of the right triode of tube 701, cutting off this triode, and turning on the left triode. When the right triode is cut off, a positive voltage is supplied to connection 713; and when the left triode is turned on, a negative voltage is applied to the control grid of tube 702.

The anode of tube 702 is connected to the anode supply source, and the cathode is connected through capacitor 17 to ground, thus, capacitor 17 is charged through tube 702. The negative voltage from the anode of the left triode of tube 701 cuts off conduction in tube 702 and thus opens the charging circuit of capacitor 17. Tube 702 corresponds to the gate 2*a*, Fig. 1.

Tube 605, Fig. 6, is connected to form a bistable multivibrator, or flip-flop, with the left triode off and the right on. The positive voltage supplied from connection 713 through capacitor 661 and rectifier 662 to the control grid of the left triode of tube 605, turns on this triode, which in turn applies a negative voltage to the control grid of the right triode, to cut off this triode, and also applies a negative voltage through resistor 663 to the control grid of tube 602, opening the gate formed of tubes 601, 602, to admit the random pulses to the counter tubes 603 and 606. Tube 605 thus corresponds to part of device 2, Fig. 1.

Thus, a short time after the correct value of $V_p$, the probability voltage, has been determined, the charging circuit of capacitor 17 is opened; and the random pulses are admitted to the counting circuit.

The positive plate of capacitor 17, Fig. 7, is connected to the anode of tube 704; the cathode of tube 704 is connected to the anode of tube 705, and, through resistor 720 to ground; and the second grid of tube 704 is connected to the potential divider formed by resistors 721, 722, connected across the negative voltage supply, and is biased so that, when the first grid of this tube is also biased negatively, conduction of this tube is cut off. The cathode of tube 705 is connected through resistor 724 to the negative voltage supply; the first grid is connected through resistor 723 to the negative voltage supply; and the second grid is connected to the brush of a potentiometer 725, having a winding connected across the negative voltage supply, which may be adjusted to determine the magnitude of the discharge current from capacitor 17. The current flowing in resistor 720 biases the cathode of tube 704 negatively with respect to ground.

Tube 703 is connected as a bistable multivibrator, or flip-flop, with the left triode off and the right triode on, and corresponds to device 3, Fig. 1. The anodes of tube 703 are respectively connected through resistors 727, 728 to ground, while the cathodes are connected through resistor 729 to the negative voltage supply. The anode of the right triode of tube 703 is connected through resistor 718 to the first grid of tube 704; and this grid is connected through resistor 719 to the negative voltage supply, so that normally the bias on the first grid of tube 704 cuts off the conduction in this tube.

The first random pulse from tube 606, Fig. 6, turns on the left triode of tube 703, Fig. 7, and turns off the right triode. The consequent rise in the anode voltage of the right triode, decreases the bias on the control grid of tube 704, permitting capacitor 17 to commence discharging at constant current through tubes 704, 705, which correspond to the constant-current discharger 18, of Fig. 1. The voltage across capacitor 17 is supplied to cathode follower tube 706, and appears as a voltage across resistor 726 which is supplied through resistor 716 to the control grid of the right triode of of tube 707.

The anodes of tube 707 are respectively connected through resistors 731, 732, to the anode source, and the cathodes are connected through resistor 733 to the negative voltage supply. The control grid of the left triode is connected to the brush of the potentiometer 730, having a winding connected across the anode supply. Normally, this left triode functions as a compensating tube, of the type shown in United States Patent 2,308,997, January 19, 1943, S. E. Miller. The anode of the right triode of tube 707 is coupled through resistor 734 to the control grid of tube 708, and this control grid is connected through resistor 735 to the negative voltage supply. Resistor 736 supplies negative feedback from the output circuit to the input circuit of tube 707.

The anodes of tubes 708, 709, are respectively connected by resistors 740, 741, to the anode supply and the cathodes are connected through resistor 742 to ground. The control grid of tube 709 is connected to the brush of potentiometer 743, having a winding connected across the negative voltage supply. The second grids are cross-connected to the anodes, to form a bistable multivibrator, or flip-flop, with tube 708 off and tube 709 on. Such a combination is very sensitive to the input voltage, and, by adjustment of potentiometer 743, is set to operate just as the resultant voltage supplied to the control grid of the right triode of tube 707 becomes zero.

Tube 710 is connected as a bistable multivibrator, or flip-flop, with the left triode normally on, and the right triode off.

The voltage supplied through resistor 716 is positive, large, and decreasing, while the voltage supplied through resistor 714 is negative and smaller, so that, initially, the voltage supplied to the control grid of tube 708 is negative. The voltage supplied through resistor 716 decreases, decreasing the negative voltage supplied to the control grid of tube 708; and, eventually, when the voltage supplied through resistor 716 has decreased to equality with the voltage supplied through resistor 714, the voltage supplied to the control grid of tube 708 reaches the critical value, turning on tube 708, and cutting off tube 709. The resultant drop in the anode voltage of tube 708, cuts off the left triode of tube 710, and turns on the right triode. Tubes 707, 708, 709, 710, correspond to detector 19, Fig. 1.

Tube 711 is a pentagrid converter tube, with the anode connected through resistor 750 to the anode supply, and with the cathode and grid number 5 grounded. Grids numbers 4 and 2 are connected to the potential divider formed of resistors 754, 755, connected across the anode and negative voltage supplies and are biased positively. Grid 3 is connected through resistor 745 to the anode of the left triode of tube 710, and through resistor 746 to the negative voltage supply. Normally, when the left triode of tube 710 is conducting, grid 3 is heavily biased negatively; but, when the left triode of tube 710 is cut off, the bias on grid 3 is removed. Grid 1 is connected to the brush of potentiometer 751, which potentiometer is connected between connection 641 and the potential divider formed by resistors 752, 753, connected across the negative voltage supply, and thus the control grid of tube 711 has a moderate negative bias.

The anode of tube 711 is connected by capacitor 756 to the signal grid of the left triode of tube 712, which is connected as a conventional voltage amplifier, driving the right triode as a cathode follower, to supply the amplified voltages to connection 760. Tubes 711, 712, correspond to the gate 2c, Fig. 1.

Before tube 710, Fig. 7, is operated, the heavy bias on grid 3 of tube 711 cuts off the conductivity of this tube, so that, if the second random pulse is transmitted from tube 606, Fig. 6, over connection 641 to the first grid of tube 711, Fig. 7, the pulse will not be transmitted by tube 711. However, after tube 710 has been operated to remove the bias from grid 3 of tube 711, if the second random pulse is then transmitted over connection 641 to the first grid of tube 711, this pulse will be transmitted by tube 711, amplified by tube 712 and supplied to connection 760.

The first random pulse started the discharge of capacitor 17 which continued discharging until the voltage across capacitor 17 decreased to equality with the probability voltage, when the operations of tubes 707, 708, 709, 710, opened the gating tube 711, thus measuring a particular time interval related to the probability of the occurrence of an event. The occurrences of the first and second random pulses measured a random time interval. If the random time interval is longer than the particular time interval, that is, if the second pulse occurred after the gate was opened, a signal is given that the event has occurred; if the random time interval is less than the particular time interval, that is, the second pulse occurred before the gate was opened, then no signal is given.

The first random pulse operated tube 703, turning on the left triode, and cutting off the right triode. The delayed second pulse from tube 607, Fig. 6, is conducted by connection 657 to the control grid of the right triode of tube 703, Fig. 7, restoring this tube to its original condition. The drop in the anode voltage of this right triode restores the bias to tube 704, cutting off the discharge of capacitor 17. The rise in the anode voltage of the left triode of tube 703 is supplied through capacitor 717 to the control grid of the right triode of tube 701, restoring this tube to its original condition. The rectifier 662, Fig. 6, prevents the negative voltage applied to connection 713 by the restoration of tube 701, Fig. 7, from affecting tube 605, Fig. 6. The rise in voltage of the anode of the left triode of tube 701 energizes tube 702, so that capacitor 17 will recharge to full voltage. The large positive voltage across capacitor 17 is repeated by tube 706, reversed in polarity by the right triode of tube 707, and applied to the first grid of tube 708, restoring tubes 708, 709, to their original condition; and, in turn restoring tube 710 to its original condition, thus closing the gating tube 711.

The delayed second pulse from tube 604, Fig. 6, applies a negative voltage to the control grid of the left triode of tube 607, and the consequent rise in anode voltage of this triode is transmitted through capacitors 655, 644, resistor 645, connection 646, resistor 663 to the control grid of the right triode of tube 605, restoring this tube to its original condition, thus applying a positive voltage through resistors 664, 663, to the control grid of the right triode of tube 602, closing the gate formed of tubes 601, 602, to prevent the transmission of any more random pulses.

The delayed second pulse applies a positive voltage by connection 572, Figs. 6, 5, 3, and capacitor 311 to the control grid of the left triode of tube 302, restoring this tube to its original condition. The restoration of tube 302 applies a negative voltage to the first grid of tube 303, stopping the discharge of capacitor 11; applies a negative voltage to the control grid of the right triode of tube 301, which is ineffective in changing the condition of this tube; and applies a positive voltage through capacitor 321 to the control grid of the right triode of tube 305, restoring this tube to its original condition. The restoration of tube 305 applies a positive voltage to the control grid of the left triode of tube 306 opening the charging circuit for capacitor 11; and applies a negative voltage to connection 527 and a positive voltage to connection 529. The negative voltage is supplied by connection 527 to disable the detector tube 508, Fig. 5. The detector tube 508 supplies a negative voltage through tube 509 to the control grid of the right triode of tube 510 restoring this tube to its original condition. The restoration of tube 510 applies a positive voltage through resistors 541, 540 to the control grid of tube 503, opening the discharge path of capacitor 14; applies a positive voltage through resistor 542 to the control grid of tube 506, closing the gate between capacitor 14 and amplifier 16; and applies a negative voltage to the control grid of the left triode of tube 511, which is ineffective to change the condition of this tube. The positive voltage from connection 529 is applied through resistor 517 to the grids of tube 501, opening the charging circuit for capacitor 14. The circuit has thus been restored to its original condition, in preparation for another determination.

The system shown in Fig. 1 determines on a random basis, for a particular value of the parameter X, whether an event did, or did not, occur. This parameter may be changed, if desired, for successive determinations.

The event-from-probability determining circuit described above yields a single event out of two possible mutually-exclusive events, with preassigned probabilities. The circuit may also be extended to yield a single event, out of *n* possible mutually-exclusive events.

It is to be understood that the above-described arrangements are illustrative of the application of the principles of the invention. Numerous other arrangements may be devised by those skilled in the art without departing from the spirit and scope of the invention.

What is claimed is:

1. In combination, a source of frequency-band-limited voice voltage, means connected to said source for generating random electrical pulses when said voltage passes through successive zeros of the same sign to determine time intervals of random duration, means for choosing a particular pulse as a first pulse and a succeeding pulse as a second pulse, a normally disabled gating device connected from said means for choosing first and second pulses to a utilization circuit, a direct current source of voltage representing the probability of the occurrence of an event, a charged capacitor, means energized by said first pulse to initiate the discharge at constant current of said capacitor, and detection means connected to the source of said probability voltage and said capacitor and to said gating device to enable said gating device when the voltage across said capacitor has diminished to equality with said probability voltage, thus determining a particular time interval to pass the second pulse to the utilization circuit when said time interval of random duration is longer than said particular time interval.

2. The combination in claim 1 in which said pulse generating means comprises a rectifier connected to the source of noise voltage, a blocking oscillator, and a differentiating capacitor connecting said rectifier and said oscillator to energize said oscillator when said noise voltages pass through successive zeros of the same sign.

3. In combination, a source of frequency-band-limited noise voltage, a rectifier connected to said source, a blocking oscillator, a differentiating capacitor connecting said rectifier and said oscillator to energize said oscillator when said noise voltage passes through zero in a desired direction, a first gating device connected to said oscillator, a second gating device connecting said first gating device to a utilization circuit, means for generating a voltage representing the probability of the occurrence of an event and for opening said first gating device when said voltage has been generated, a charged capacitor, means connected to said oscillator and energized by the first pulse from said oscillator to initiate the discharge at constant current of said capacitor, a detector connected to the means for generating the probability voltage and said capacitor and to said second gating device to open said second gating device when the voltage across said charged capacitor has diminished to equality with said probability voltage to pass the second pulse from said oscillator to said utilization circuit, when said second pulse occurs after said second gating device has been opened.

4. In combination, a source of electrical pulses of random occurrence and short duration, a first gating device connected to said source, means for generating a voltage representing the probability of the occurrence of an event, a first bistable circuit connected to said first gating device and said generating means to be operated when the correct magnitude of the probability voltage has been attained to open said first gating device, a second, counting, bistable circuit connected to said first gating device to be operated by the first random pulse after said first gating device has been opened and restored by the second random pulse after said first gating device has been opened, a capacitor, a charging circuit for said capacitor connected to be closed by the operation of said first bistable circuit and to be opened by the restoration of said first bistable circuit, a third bistable circuit, connected to said second bistable circuit to be operated by said first random pulse, a discharging circuit for said capacitor connected to be opened by the operation of said third bistable circuit, a second gating device connected between said second bistable circuit and a utilization circuit, a detector circuit connected to said generating means and said capacitor and to said second gating device to open said second gating device when the voltage across said capacitor falls to equality with said probability voltage to pass the second random pulse to the utilization circuit if this second pulse occurs after the second gating device has been opened, a monostable circuit connected to said second bistable circuit and energized by said second pulse to produce a delayed second pulse, and connections from said monostable circuit to said first bistable circuit and to said third bistable circuit, whereby said delayed second pulse restores said first bistable circuit to close said first gating device and open said charging circuit, and said delayed second pulse also restores said third bistable circuit to close said discharging circuit.

5. The combination in claim 4 in which said source of random pulses comprises a source of electrical noise voltage, a filter connected to said source to limit the frequency band of the transmitted noise voltage, a rectifier circuit connected to said filter, a blocking oscillator, and a differentiating capacitor connected from said rectifier circuit to said oscillator, whereby said oscillator is energized when said noise voltages pass through successive zeros of the same sign.

6. The combination in claim 4 in which the means for generating the probability voltage comprises a second capacitor, a third gating device, a resistor, means connecting said resistor in the discharge path of said second capacitor and in series with said third gating device, said third gating device being open until subsequently closed, said second capacitor and said resistor being proportioned so that the voltage across said second capacitor during discharge varies with time along a desired curve, a charging circuit for said second capacitor, a third capacitor, a charging circuit for said third capacitor, a discharging circuit for said third capacitor, a fourth bistable circuit connected to the charging circuit of the second capacitor and to the charging and discharging circuits of the third capacitor and operated by an initiating pulse to close the charging circuits to said second and third capacitors and to open the discharging circuit of said third capacitor, a fourth gating device connected to said second capacitor, and a second detector circuit connected to said third and fourth gating devices and said third capacitor, a source of a voltage representing a parameter of the probability function connected to said second detector, whereby when the voltage across said third capacitor falls to equality with said parameter voltage said third gating device is closed and said fourth gating device is opened, whereby the voltage at the junction of said second capacitor and said resistor appears as an output of said fourth gate as said probability voltage, and a connection from said monostable circuit to said fourth bistable circuit, energized by said delayed second pulse to restore said fourth bistable circuit, which in turn closes said discharging circuit for said third capacitor and opens said charging circuits for said second and third capacitors, and, through said second detector opens said third gating device and closes said fourth gating device.

7. The combination in claim 4 wherein said discharging circuit operates at constant current, and means to open and close said discharging circuit under control of said third bistable circuit.

8. The combination in claim 5 in which the delay of the second pulse is less than the period of the highest frequency of the frequency band.

9. The combination in claim 6 in which the second detector is connected to said fourth bistable circuit so that said second detector produces a desired output only when gated by said fourth bistable circuit.

10. The combination in claim 6 wherein said resistor may have a non-linear voltage-current curve, in order better to approximate a given probability curve.

11. The combination in claim 6 wherein an inductor may also be used in series with said resistor, linear or non-linear, in order better to approximate a given probability curve.

12. In combination, means for providing a source of pulses occurring at random time intervals, a pulse output circuit, first and second gating circuits connected between said source of random pulses and said pulse output circuit, starting circuit means for opening said first gating circuit, timing circuit means for providing a standard decaying voltage following an initiating signal, adjustable circuit means for providing a direct current probability voltage signal, comparison means for changing the state of said second gating circuit when said decaying voltage reaches a predetermined value relative to said probability voltage, means responsive to the occurrence of the first random pulse following the opening of said first gating circuit for applying an initiating signal to said timing circuit means, and means responsive to the occurrence of a second random pulse for closing said first gating circuit.

13. In combination, means for providing a source of pulses occurring at random time intervals, a pulse output circuit, first and second gating circuits connected between said source of random pulses and said pulse output circuit, starting circuit means for opening said first gating circuit, timing circuit means for providing a standard voltage waveform following an initiating signal, adjustable circuit means for providing a direct current probability voltage signal, comparison means for changing the state of said second gating circuit when said standard voltage waveform reaches a predetermined value relative to said probability voltage, means responsive to the occurrence of the first random pulse following the opening of said first gating circuit for applying an initiating signal to said timing circuit means, and means responsive to the occurrence of a second random pulse for closing said first gating circuit.

14. An electronic probability circuit comprising means for providing first and second electrical pulses of short duration and random occurrence, a utilization circuit, a gating circuit connected between said random pulse providing means and said utilization circuit, adjustable circuit means for providing a direct current probability voltage, timing circuit means including a capacitor for providing a standard decaying voltage following an initiating signal, means energized by said first pulse to apply an initiating signal to said timing circuit means, and signal comparison means for changing the state of said gating circuit when said decaying voltage reaches a predetermined value relative to said probability voltage.

15. An electronic probability circuit comprising means for providing a source of first and second electrical pulses of short duration and random occurrence, a gating device connected between said source and a utilization circuit, adjustable circuit means for providing a direct current probability voltage, timing circuit means including a capacitor for providing a standard voltage waveform following an initiating signal, means energized by said first pulse to apply an initiating signal to said timing circuit means and thereby start said standard waveform, and signal comparison means for changing the state of said gating device when said standard waveform reaches a predetermined value relative to said probability voltage.

16. In combination, means for providing a source of pulses occurring at random time intervals, a pulse output circuit, first and second gating circuits connected between said source of random pulses and said pulse output circuit, starting circuit means for opening said first gating circuit, timing circuit means for changing the state of said second gating circuit at a predetermined time interval after the reception of an initiating signal, means responsive to the occurrence of the first random pulse following the opening of said first gating circuit for applying an initiating signal to said timing circuit means, and means responsive to the occurrence of a second random pulse for closing said first gating circuit.

17. In combination, means for providing a source of pulses occurring at random time intervals, a pulse output circuit, first and second gating circuits connected between said source and said pulse output circuit, starting circuit means for opening said first gating circuit, timing circuit means for changing the state of said second gating circuit at a predetermined time interval after the reception of an initiating signal, means for applying an initiating signal to said timing circuit means, and means responsive to the occurrence of the first random pulse following the application of an initiating signal to said timing circuit means for closing said first gating circuit.

References Cited in the file of this patent

UNITED STATES PATENTS

| | | |
|---|---|---|
| 2,414,477 | Meachem | Jan. 21, 1947 |
| 2,426,216 | Hight | Aug. 26, 1947 |
| 2,478,670 | Skellett | Aug. 9, 1949 |
| 2,491,029 | Brunn | Dec. 13, 1949 |
| 2,532,338 | Schlesinger | Dec. 5, 1950 |
| 2,605,410 | Friend | July 29, 1952 |
| 2,647,206 | Trousdale | July 28, 1953 |
| 2,651,753 | Buyer | Sept. 8, 1953 |
| 2,666,136 | Carpenter, Jr. | Jan. 12, 1954 |
| 2,715,815 | Malick et al. | Aug. 23, 1955 |
| 2,738,463 | Metzger | Mar. 13, 1956 |
| 2,744,247 | Wilmotte | May 1, 1956 |